UNITED STATES PATENT OFFICE 2,013,524

NASAL MEDICAMENT

Albin M. Painter, deceased, late of Kansas City, Mo., by Katharine D. Painter, administratrix, Kansas City, Mo., Hamilton P. Cady, Lawrence, Kans., and George C. Henson, Liberty, Mo.

No Drawing. Application June 21, 1933,
Serial No. 676,919

2 Claims. (Cl. 167—58)

This invention relates to nasal medicaments and more particularly to an improved nasal medicament in colloidal form.

In recent years, it has become increasingly wide practice to treat nasal disaffections and ailments, such as rhinitis, coryza, nasal catarrh, hay fever, and the like, by introducing a medicament directly into the nasal passage. These remedies generally fall into two classes, an ointment having a petrolatum or lanolin or other greasy base, and liquids in which the remedies are dissolved in oil.

The effectiveness of these remedies is seriously impeded, due to the fact that the grease or oily base in which the remedies are carried is incompatible with the mucous membrane. In other words, the oil or grease tends to form a coating over the membrane and the treatment is transitory due to the fact that the oil is shed and does not remain in place for a sufficiently long period of time. The most effective mode of treatment is by aqueous solutions inasmuch as water is not incompatible with the mucous membrane and will tend to spread thereover. Obviously, however, the use of aqueous solution remedies will be even shorter in their period of treatment.

An infection or irritation to the mucous membrane results in exciting the nerve endings in the nasal passages producing a congregation of antibodies in the affected area. This results in congestion, which further increases the irritation.

One object of this invention is to provide a nasal medicament having the form of an emulsion in which the water is in the internal phase and in which no oil is used.

Another object of this invention is to provide an emulsion in which water is in the internal phase and the remedies are in solution in the water.

Another object of this invention is to provide a nasal medicament in which the heat of the body will slowly break down the emulsion to provide a continuous release of an aqueous solution containing the remedies.

In general, this invention contemplates the use of an emulsion in which water soluble antiseptics and anesthetics are carried in the internal phase in solution in the water and certain other remedies are carried in the external phase or the emulsifying agent. The anesthetic will act to temporarily arrest the activity of the nerve endings and thus inhibit congestion, while the antiseptics will act as a bactericide.

More particularly, it has been found that the aldehyde of cholesterol will produce an emulsion with water in which the water is in the internal phase and the aldehyde of the cholesterol (oxycholesterol) is in the external phase. A cholesterol is an unsaturated monohydric alcohol of high molecular weight having the formula of $C_{27}H_{45}OH$. Oxycholesterol, which is the aldehyde formed from this alcohol, has been found to be admirably suited to the purpose of this invention. It is compatible with the mucous membrane in that it will spread thereover and will form an emulsion with the mucous. It is a pearly solid at ordinary temperatures and has a melting point of 37° C. or about 98.6° F. which is the temperature of the human body. An emulsion formed by oxycholesterol and water will put water in the internal phase. This form of emulsion is the contrary to the usual water emulsions formed with oils by means of gums, alkalies, or soaps in that, in the emulsions which have been known to the prior art, the water is in the external phase and the oil is in the internal phase. In an emulsion made with oxycholesterol, it has been found that an emulsion is formed which is very stable at ordinary temperatures. It has also been found that the stability of the emulsion can be increased somewhat by the use of a deflocculating agent which, in the case of oxycholesterol, is of an acid character. Hydrochloric acid in small quantities has been found to have the effect of making the emulsion more stable in that it acts as a deflocculating agent for the oxycholesterol.

When oils and fats or greases have been used as the carrying agent for nasal medicaments, water soluble remedies have been unavailable. It has been found that the most admirable remedies for treatment of the nasal passage are those which are water soluble. As an antiseptic, oxyquinoline sulphate is preferable. This remedy is a yellow crystalline powder, easily soluble in water. It has analgesic properties. It is nontoxic and is a more powerful antiseptic then corrosive sublimate. It does not coagulate albumin or injure mucous membrane or tissues. For nasal use, it can be used in solutions having a concentration up to one in one thousand, with safety. Another antiseptic which it has been found is valuable is hexylresorcinal. This compound has a high phenol coefficient and is nonirritant and non-toxic. Such remedies as glycerin and ethylene glycol, which are water soluble, may also be used in the water phase. For the anesthetic, it has been found that a-butyl-oxycinchoninic acid diethyl-ethylene-diamide hydrochlorite is admirably suited. This compound has lasting anesthetic properties and is not habit forming. It will decompose in the presence of alkali, but inasmuch as the emulsion is made slightly acid by the hydrochloric acid deflocculating agent, the anesthetic is preserved in stable form, being a hydrochloride of a weak organic base.

Trichlorbutanol and menthol are not water soluble. These remedies are particularly suited for nasal ailments and it has been found that they are soluble in and will be carried by the oxycholesterol in the external phase.

The emulsion is formed in any suitable manner, such as by means of a homogenizer at a temperature of about 40° C. The finished product may have any suitable consistency and it is found that an emulsion which will not flow but will have the consistency of an ointment is suitable.

As a specific example of one preparation embodying our invention, the following is given. In this connection it is understood, however, that the example is not to be considered as a limitation but is given merely by way of illustration. 1000 cc. of distilled water is taken, to which is added 1 cc. of hydrochloric acid. The hydrochloric acid gives the hydrogen-ion concentration necessary and acts as a deflocculating agent. To this solution 2½ grams of phenol are added and then 3½ grams of a-butyl-oxycinchoninic acid diethyl-ethyleneamide hydrochloride are added. Then 2 grams of oxyquinoline sulphate are stirred into the solution. When the whole is dissolved, 150 grams of glycerine and 250 grams of ethylene glycol are added, the solution being heated in a glass vessel to a temperature above that of the human body, preferably around 125° F. The cholesterol aldehyde, that is, oxy-cholesterol, is likewise heated to a temperature of 125° F. which will serve to render it in a liquid state. While in this state, 15 grams of menthol, 30 grams of chlorbutanol, and 10 grams of hexylresorcinal are stirred into the oxy-cholesterol. The emulsion is then made in a glass lined mixing device, preferably of the vacuum type, the aqueous solution being slowly added, while the mixture is in operation. When emulsification is complete, the resultant product is a thick, creamy substance, being an emulsion with the aqueous solution in the internal phase.

Due to its antiseptic and anesthetic properties, the remedy may be used in treating other ailments. For example, it has been found to be very effective in the case of burns. The anesthetic stops the pain, the thick creamy consistency covers the area, and the antiseptic keeps the burn in sterile condition. It is obvious, of course, that many other uses will suggest themselves to those skilled in the art. It will be understood that certain features and sub-combinations are of utility and may be employed without reference to other features and sub-combinations. This is contemplated by and is within the scope of the claims. It is further obvious that various changes may be made in details within the scope of the claims without departing from the spirit of the invention. It is, therefore, to be understood that this invention is not to be limited to the specific details shown and described.

This invention claims:

1. A nasal medicament comprising an emulsion of water and oxycholesterol, with water in the discontinuous phase and oxycholesterol in the continuous phase and having a water soluble remedy dissolved in the water and an oil soluble remedy dissolved in the oxycholesterol.

2. A nasal medicament consisting of an emulsion of water, oxycholesterol, and a deflocculating agent, the water bearing a water soluble remedy and the oxycholesterol bearing an oil soluble remedy.

KATHARINE D. PAINTER,
*Administratrix of the Estate of Albin M. Painter, Deceased.*
HAMILTON P. CADY.
GEORGE C. HENSON.